Figure 1:
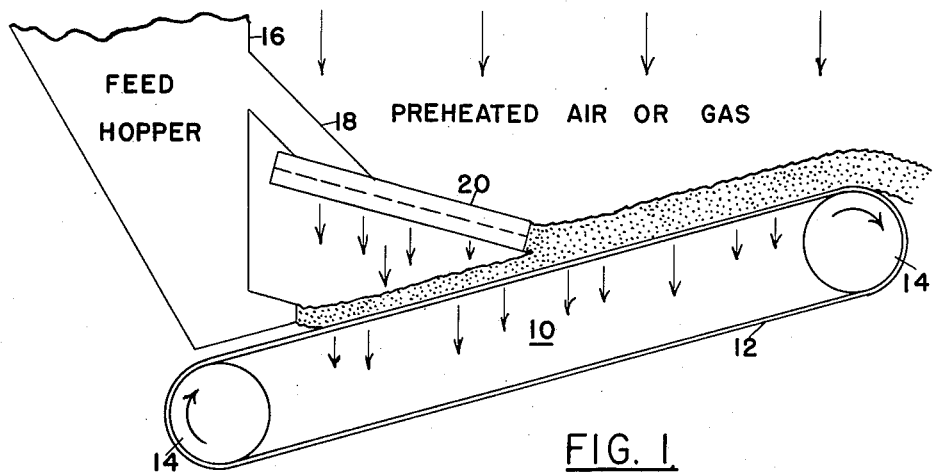

Dec. 11, 1951  J. HYSLOP  2,578,357
METHOD FOR TREATING GRANULAR SOLIDS
Filed June 18, 1949

INVENTOR
JAMES HYSLOP
BY
*D. Leigh Fowler, Jr.*
ATTORNEY

Patented Dec. 11, 1951

2,578,357

UNITED STATES PATENT OFFICE 2,578,357

METHOD FOR TREATING GRANULAR SOLIDS

James Hyslop, St. Clairsville, Ohio, assignor to Pittsburgh Consolidation Coal Company, Pittsburgh, Pa., a corporation of Pennsylvania Application June 18, 1949, Serial No. 100,056

2 Claims. (Cl. 34—25)

This application is directed to a method for treating granular solids with gases.

The primary object of this invention is to provide an improved method for contacting gases and granular solids.

Another object of my invention is to provide an improved method for heating granular solids to expel volatile matter contained therein in a uniform manner.

A still further object of this invention is to provide an improved method for uniformly drying solids, and particularly, coal.

In accordance with my invention I have provided a method for contacting gases and granular solids in which a stream of granular solids having a progressively increasing depth along the path of travel of the stream of solids is caused to move laterally through a treating zone. Gas is circulated downwardly through the moving stream of solids to effect treatment of solids. The progressively increasing depth of the solids in the stream is effected by adding fresh solids at one or more points along the stream directly onto the solids already present in the stream. In this manner a plurality of untreated surfaces are uniformly and directly exposed to the action of the treating gas along the entire length of the stream. All of the solids subjected to the treatment are initially added in this manner so that they may receive the benefit of direct contact with the treating gas in its most effective treating condition.

My invention is particularly applicable but not limited to the heating of coal in granular form to expel water or other volatile components. It is common practice today to wash and clean coal. As a result, considerable moisture is picked up by the coal and causes it to be more difficult to handle, as well as affecting its burning properties. I am aware that it has been proposed, and in fact practiced, to dry coal by circulating preheated air or gas downwardly through a laterally moving stream of solids. Such a system, however, has the disadvantage that the top layer of the moving stream is exposed to the highest temperature of the treating gas along the path of its entire travel through the heating zone. As a result, the solids beneath the top layer do not receive the same treatment and so on down through the entire depth of the stream. A non-uniform dried product is therefore obtained. Furthermore, the top layer frequently becomes overheated and, if air is the heating medium, the coal starts to burn by the time it reaches the end of the heating zone. By adding the fresh solids at a plurality of points along the path of travel of the stream of solids through the heating zone, successive superimposed layers are established, each of which receives the same heating treatment during the course of its travel.

Figure 2:
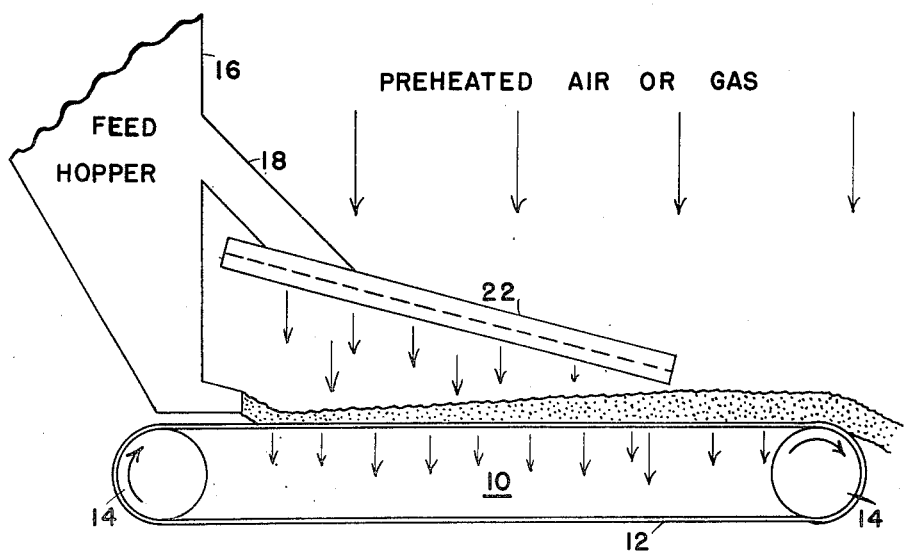

For a better understand of my invention and its objects, reference should be had to the following detailed description and to the attached drawings, in which:

Figure 1 is a diagrammatic illustration of an apparatus adapted to carry out an embodiment of my invention; and Figure 2 is a diagrammatic illustration of a modification of the apparatus in Figure 1.

Referring specifically to Figure 1, the apparatus therein disclosed and its operation will now be described. Numeral 10 designates a conveyer which comprises an endless belt 12 consisting preferably of a woven wire fabric commonly used for such purposes and two rollers or drums 14 about which the belt is caused to travel by suitable driving means, not shown. The conveyer in this embodiment is shown as tilted upwardly in the direction of movement of the upper portion of the conveyer belt. This is to aid in building up of a progressively enlarged stream of solids, as will later appear. As the belt 12 is caused to travel in a direction away from the solids feeding devices, fresh granular coal is fed to the end of the belt from a hopper 16 in such amount that a shallow layer of coal is maintained on this end of the belt. Air or gas preheated to a sufficiently high temperature to effect volatilization of the water in the coal, that is, of the order of 500° F., is circulated downwardly through the freshly added coal by means of a suitable suction device, not shown. This initial layer of fresh coal is thereby heated and partially dried, the evolved water being carried downwardly through the belt along with the treating gas. At a point sufficiently removed from the initial point of addition of the fresh solids to permit at least partial drying thereof to have been completed, a further addition of fresh solids is made directly into the initial layer from the hopper 16 through a discharge conduit 18 and from a vibrating screen element 20 which discharges the coal from the outer end thereof. Preheated air or gas like that used to dry the initial layer of coal is caused to circulate down through the second additional superimposed layer. Water is evolved and is conducted downwardly through the previously treated layer and carried off by the circulating gas. Condensation of water on the lower layer does not occur because of the previous heat treatment of the first layer immediately following its discharge onto the conveyer. If desired, more than one additional discharge element 20 may be employed to feed fresh coal at successively advanced points along the conveyer belt. The number will depend upon the temperature of the preheating air or gas, the length of travel of the solids through the heating zone and the depth of each added layer. The dried solids are conducted from the end of the conveyer to a suitable storage place. The product is found to be substantially uniform in moisture content and no danger of combustion of the coal is encountered.

In Figure 2 a modification of the apparatus disclosed in Figure 1 is shown and will now be described. In this figure, the same numbers are used to designate parts corresponding to those shown in Figure 1. There are two features of the apparatus in Figure 2 that are different from those shown in Figure 1. In the first place, the conveyer 10 in Figure 2 is disposed in a horizontal plane merely to illustrate that it is not essential that the conveyer be tilted upwardly. The second and primary distinguishing feature is the employment of a vibrating screen element 22 which is supplied with coal through conduit 18 leading from the hopper 16. This vibrating screen element extends substantially the entire length of the conveyer and is perforated in the under part thereof to permit feeding of coal uniformly over the top of the conveyer belt. In operation, coal is not only fed from the lower end of the hopper 16 onto the moving belt, but is also discharged uniformly by means of the screen element 22 along the path of travel of the stream of solids to thereby provide a stream of continuously and progressively increasing depth from one end of the belt to the other. In this manner, substantially all of the fresh coal is subjected to the preheated air or gas at the maximum temperature of the gas. Consequently, an extremely uniform product is recovered at the end of the heating treatment.

If desired, the above described method and apparatus may be employed in volatilizing other materials than water. For example, low temperature distillation of coal may be accomplished in a similar manner and to great advantage by circulating preferably an inert gas at a temperature above 700° F. downwardly through the coal stream. The evolved gases and tars may be recovered from the treating gas by condensation and other well-known methods. If the coal is a coking coal, then it may be advisable to recycle at least a portion of the solid carbonaceous residue obtained for mixing with the fresh feed to thereby prevent agglomeration.

According to the provisions of the patent statutes, I have explained the principle, preferred construction, and mode of operation of my invention and have illustrated and described what I now consider to represent its best embodiment. However, I desire to have it understood that, within the scope of the appended claims, the invention may be practiced otherwise than as specifically illustrated and described.

I claim:

1. The method of drying coal which comprises establishing a laterally moving stream of coal in a heating zone, continuously supplying fresh coal to one end of said stream prior to its passage through said heating zone, circulating heated gas downwardly through said fresh coal in said stream, whereby said coal is at least partially dried, discharging more fresh coal directly onto the top of said treated coal at a plurality of points intermediate the ends of said stream, and circulating heated gas downwardly through the resulting progressively enlarged stream of coal.

2. The method of heating coal which comprises establishing a laterally moving stream of coal in a heating zone, continuously supplying fresh coal to one end of said stream prior to its passage through said heating zone, circulating preheated gas downwardly through said fresh coal in said stream, discharging more fresh coal directly onto the top of said treated coal at a point intermediate the ends of said stream, and circulating preheated gas downwardly through the resulting enlarged stream of coal.

JAMES HYSLOP.

REFERENCES CITED

The following references are of record in the file of this patent:

UNITED STATES PATENTS

| Number | Name | Date |
| --- | --- | --- |
| 1,761,016 | Koehring et al. | June 3, 1930 |
| 1,794,542 | Piron | Mar. 3, 1931 |
| 1,877,137 | Lee | Sept. 13, 1932 |
| 1,896,884 | Cooper et al. | Feb. 7, 1933 |
| 2,119,615 | Wendeborn | June 7, 1938 |
| 2,152,167 | Ahlmann | Mar. 28, 1939 |
| 2,174,066 | Ahlmann | Sept. 26, 1939 |
| 2,209,636 | Schubert | July 30, 1940 |
| 2,328,714 | Drill et al. | Sept. 7, 1943 |
| 2,366,779 | Gaumer | Jan. 9, 1945 |
| 2,481,949 | Richardson | Sept. 13, 1949 |